(12) United States Patent
Reddy

(10) Patent No.: US 12,293,168 B2
(45) Date of Patent: May 6, 2025

(54) GENERATING DIGITAL ASSISTANTS FROM SOURCE CODE REPOSITORIES

(71) Applicant: SAP SE, Walldorf (DE)

(72) Inventor: Srinivasa Byaiah Ramachandra Reddy, Bangalore (IN)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 18/198,448

(22) Filed: May 17, 2023

(65) Prior Publication Data

US 2024/0385813 A1    Nov. 21, 2024

(51) Int. Cl.
*G06F 8/35*    (2018.01)
*G06F 8/36*    (2018.01)

(52) U.S. Cl.
CPC . *G06F 8/35* (2013.01); *G06F 8/36* (2013.01)

(58) Field of Classification Search
None
See application file for complete search history.

(56) References Cited

U.S. PATENT DOCUMENTS

| | | | | |
|---|---|---|---|---|
| 11,150,880 B1* | 10/2021 | Parisa | ................ | G06N 5/01 |
| 12,148,417 B1* | 11/2024 | Cardella | ............ | G10L 15/18 |
| 2019/0121621 A1* | 4/2019 | Aggarwal | .......... | G06N 20/00 |
| 2023/0353674 A1* | 11/2023 | Karp | ................ | H04M 3/5235 |
| 2024/0070551 A1* | 2/2024 | Chen | ................. | G06N 20/20 |
| 2024/0126838 A1* | 4/2024 | Narsinghani | ......... | G06F 18/214 |
| 2024/0338528 A1* | 10/2024 | Wolfe | ................ | G06F 40/35 |

OTHER PUBLICATIONS

Xiaomeng, "A Survey on Source Code Review Using Machine Learning", 2018, International Conference on Information Systems Engineering (Year: 2018).*

* cited by examiner

*Primary Examiner* — Hossain M Morshed
(74) *Attorney, Agent, or Firm* — SCHWEGMAN LUNDBERG & WOESSNER, P.A.

(57) ABSTRACT

A machine-learning model is trained using a training set that comprises labeled examples. Each example is a source code repository for an application and each label is a digital assistant for the application. The trained machine-learning model receives a source code repository as input and generates a digital assistant as output. The machine-learning model may be trained using the transformer architecture that is based on attention mechanisms without using recurrence and convolution. Prior to use in training, a collection of source code repositories may be filtered to remove repositories or files that use unknown or unsupported programming languages, that are labeled with incorrect or invalid digital assistant definitions, that include too many or too few files, or that include too many or too few lines of code. A separate machine-learning model may be trained for each programming language, for each digital assistant definition framework, or for each language/framework pair.

20 Claims, 11 Drawing Sheets

GENERATING DIGITAL ASSISTANTS FROM SOURCE CODE REPOSITORIES

TECHNICAL FIELD

The subject matter disclosed herein generally relates to automated systems for user interaction. Specifically, the present disclosure addresses systems and methods to automatically generate digital assistants from source code repositories.

BACKGROUND

User interactions with a software application may be conducted via a conversation simulation application (e.g., a chatbot or the like) created by a developer.

DETAILED DESCRIPTION

Figure 1:
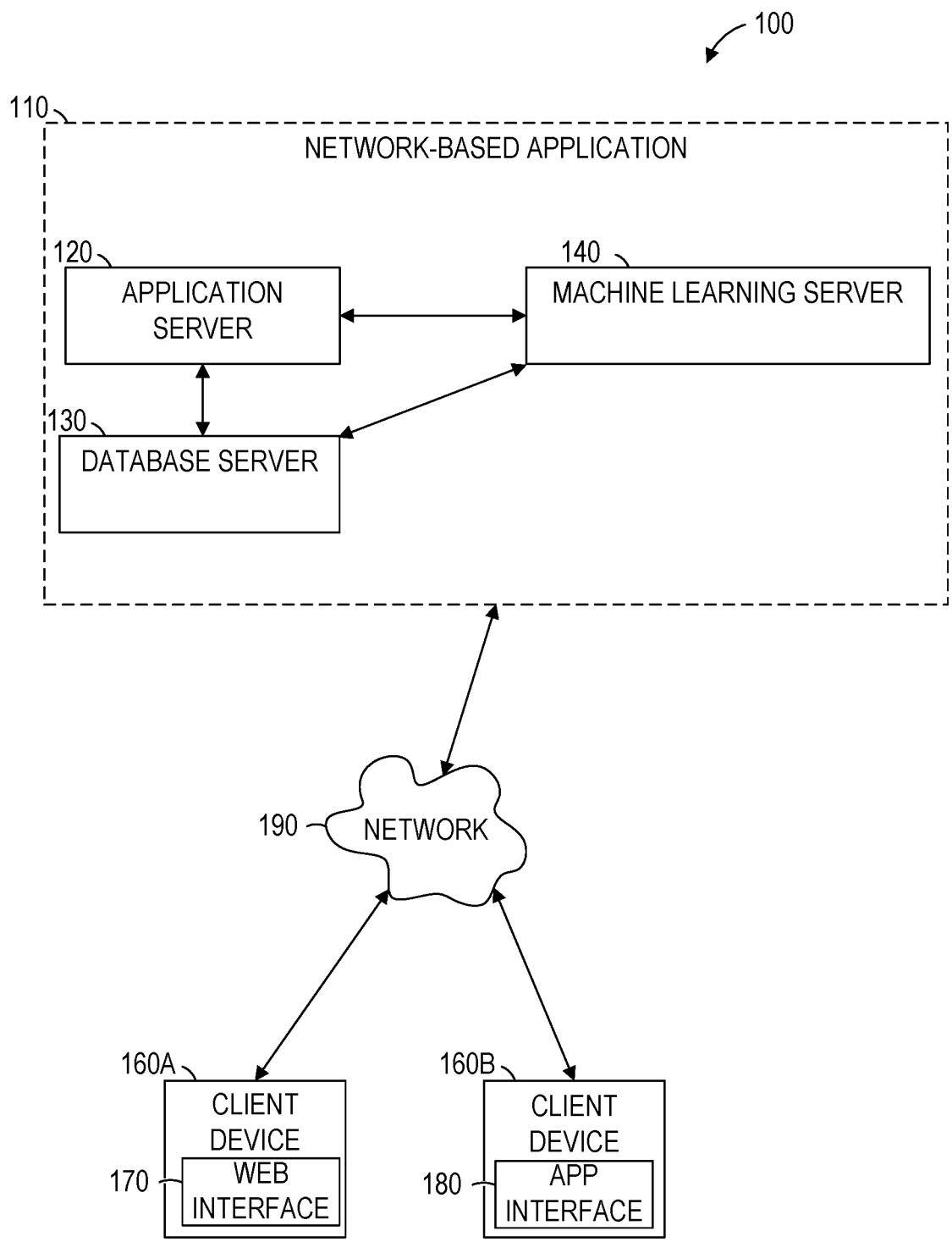
FIG. 1 is a network diagram illustrating an example network environment suitable for generating digital assistants from source code repositories.

Example methods and systems are directed to generating digital assistants from source code repositories, according to some example embodiments. A machine-learning model is trained using a training set that comprises labeled examples. Each example is a source code repository for an application and each label is a digital assistant for the application. The trained machine-learning model receives a source code repository as input and generates a digital assistant as output.

User interactions with a software application may be conducted via a conversation simulation application (e.g., a chatbot or the like). Accordingly, one or more data processing functionalities of the software application may be invoked using natural language commands. In some cases, instead of being a text input, the natural language commands may be voice commands received via a voice-based user interface. For example, the conversation simulation application may receive a natural language command invoking functionality of the software application, such as accessing or setting data values, that requires performing a sequence of operations. Alternatively or additionally, a software application may include an issue tracking system configured to generate a ticket in response to an error reported via one or more telephone calls, emails, short messaging service (SMS) messages, social media posts, web chats, and/or the like.

A digital assistant may be created by a chatbot developer. The digital assistant definition may relate expected user inputs to application functionality to enable a natural-language interface to the application. The effectiveness and efficiency of the digital assistant depends on the skill and experience of the chatbot developer, along with the degree of understanding by the chatbot developer of the application and user needs.

Each digital assistant may be defined using a low-code platform approach that uses a folder structure for dataset/entities, dataset/intents, and dialog/nodes (skills). These folders contain yaml files that define the behaviour of the digital assistant. The digital assistant may be deployed to a digital assistant platform that allows a chat interface to interact with the digital assistant.

An "intent" includes the goal of a user when entering input to a system. For example, a user may precisely define a query for a search engine. In that case, the "intent" is the same as the query. However, another user may intend to request the same information, but include typographical errors in the query or word the query vaguely. A trained machine-learning model may be used to convert the user's actual input to an input that likely reflects the user's intent.

A "skill" of a digital assistant includes a relationship between one or more conditions to be met and one or more actions to be performed when the conditions are met. For example, a skill may relate a user intent to an application programming interface (API) call. When the intent is detected, the API call is made and any results of the API call are presented to the user.

The machine-learning model may be trained using the transformer architecture that is based on attention mechanisms without using recurrence and convolution. The transformer architecture handles the input at once instead of sequentially. The architecture improves parallelization over previous models such as recurrent neural networks (RNNs), allowing training to be performed more quickly, using a larger training set, or both.

Prior to use in training, a collection of source code repositories may be filtered to remove repositories or files that use unknown or unsupported programming languages, that are labeled with incorrect or invalid digital assistant definitions, that include too many or too few files, that include too many or too few lines of code, or any suitable combination thereof. A separate machine-learning model may be trained for each programming language, for each digital assistant definition framework, or for each language/framework pair.

The digital assistant may be embedded in a web application. For example, support for one or more applications may be provided using an interactive chat interface. The interface may receive user input and provide the input to the digital assistant. In response, the digital assistant provides text to be presented to the user. For example, the response may include recommendations for actions the user may take to address an issue. The user interface may include options selectable by the user to interact with the digital assistant. For example, the digital assistant may cause the interface to present a set of options to the user. When the user selects an option, the digital assistant provides corresponding information.

In some example embodiments, the digital assistant platform may support an end-to-end lifecycle management workflow to deploy, and manage the digital assistant. In some cases, the digital assistant may be embedded in one or more enterprise software applications supporting, for example, billing, invoicing, procurement, payroll, time and attendance management, recruiting and onboarding, learning and development, performance and compensation, workforce planning, and/or the like. For example, in some cases, the digital assistant may include a machine-learning model trained to support natural language based interactions with the one or more enterprise software applications. In some cases, the machine-learning model may be trained to perform domain-specific natural language processing tasks including, for example, entity recognition, intent classification, skill resolution and execution, and the like. As such, a user at the client device may interact with the one or more enterprise software applications via one or more natural language commands provided as text inputs, voice commands, and the like. In this context, various entities (e.g., purchase order, leave requests, compensation review, and the like) may be defined with a fixed set of values or following a dynamic pattern or regular expressions (e.g., #action: {get, update, delete} entity). Intent classification may include modelling the intent associated with a natural language expression including one or more entities (e.g., name, time, purchase order, and the like). Each skill may be defined as a combination of intents, entities, conditions, and actions to be taken. For example, if intent #purchase_order is present and @po_number is present and @action is get, the skill may be to call a backend system or an external application programming interface (API) to fetch the status of the purchase order.

FIG. 1 is a network diagram illustrating an example network environment 100 suitable for generating digital assistants from source code repositories. The network environment 100 includes a network-based application 110, client devices 160A and 160B, and a network 190. The network-based application 110 is provided by an application server 120 in communication with a database server 130 and a machine-learning server 140. The application server 120 accesses application data (e.g., application data stored by the database server 130) to provide one or more applications to the client devices 160A and 160B via a web interface 170 or an application interface 180.

The application server 120, the database server 130, the machine-learning server 140, and the client devices 160A and 160B may each be implemented in a computer system, in whole or in part, as described below with respect to FIG. 11. The client devices 160A and 160B may be referred to collectively as client devices 160 or generically as a client device 160.

Users of the network-based application 110 may request information using an interactive chat interface. For example, a user may have questions about how to use certain features of the network-based application 110 or another application. Automated responses to user queries may be provided using a digital assistant.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the machine-learning server 140, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one network-based application 110, two client devices 160A-160B, and the like), any number of each element is contemplated. For example, the application server 120 may access data from dozens or hundreds of data sources and provide an application to millions of client devices.

Figure 2:
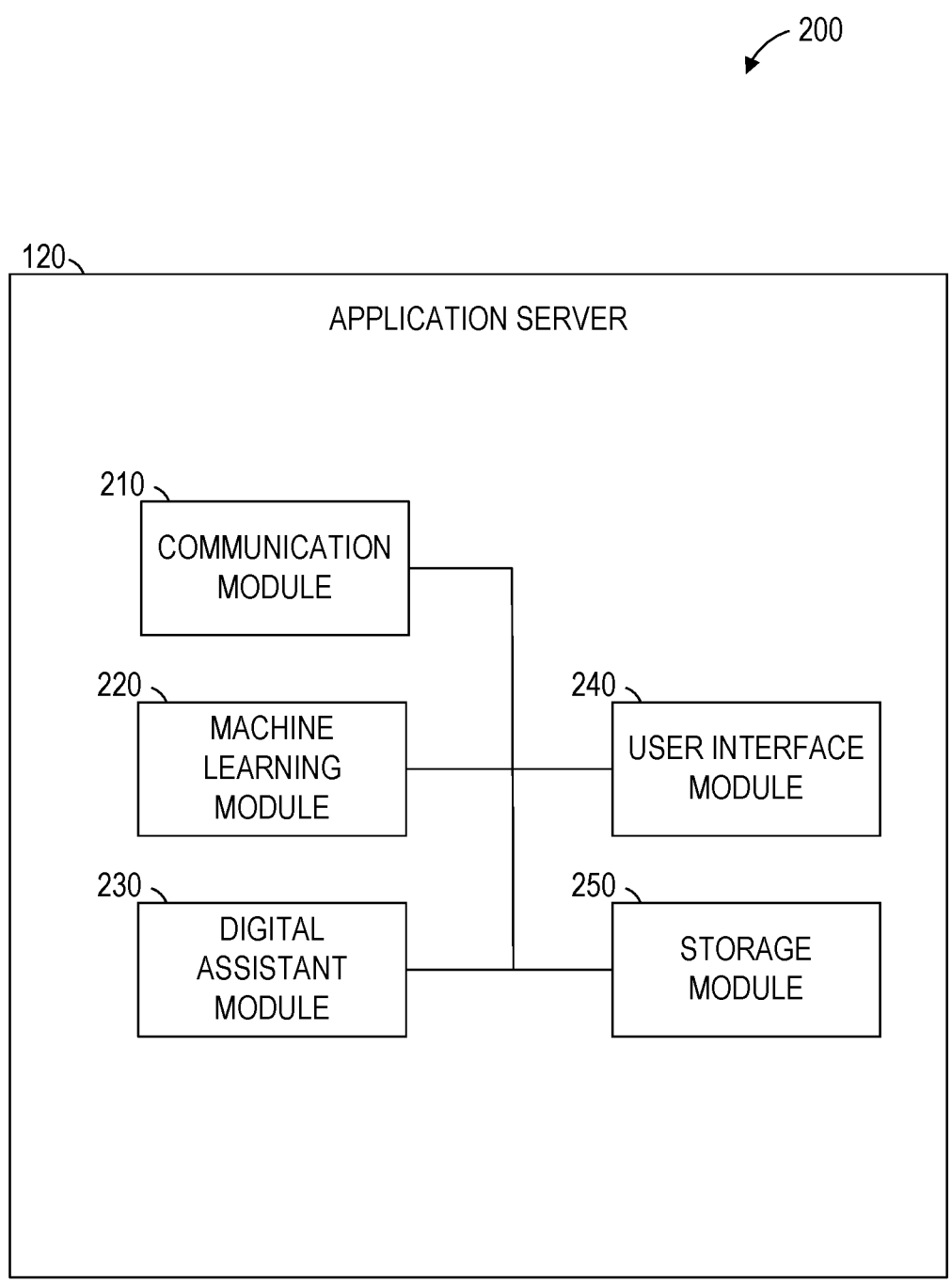
FIG. 2 is a block diagram of an application server, suitable for generating digital assistants from source code repositories, according to some example embodiments.

FIG. 2 is a block diagram 200 of an application server 120, suitable for generating digital assistants from source code repositories, according to some example embodiments. The application server 120 is shown as including a communication module 210, a machine learning module 220, a digital assistant module 230, a user interface module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the application server 120 and transmits data from the application server 120. For example, the communication module 210 may receive, from the client device 160A or 160B, a request for help with an application provided by the application server 120.

The machine learning module 220 trains a machine-learning model using training data, uses the trained machine-learning model to generate output for input data, or both. For example, the machine-learning model may be trained, using code repositories for applications and corresponding digital assistants, to generate digital assistants for applications based on the code repositories for those applications. Thereafter, the machine-learning model may receive code repositories as input and generate digital assistants. Machine-learning models may also be used for natural language processing (NLP). Input text is mapped to vectors in a high-dimensional space (e.g., vectors of hundreds or thousands of elements) such that words with similar meanings have vectors that are closer together than words with dissimilar meanings. Additionally, relationships between vectors may be maintained. For example, the relationship between the vector for "king" and "queen" may be the same as the relationship between the vector for "man" and "woman." Thus, manipulation of vectors may have semantic meaning when the vectors are converted back to human-readable language.

The digital assistant module 230 implements a digital assistant based on the output of the machine-learning module 220. For example, a digital assistant definition may be generated by the machine-learning module that links user inputs to data access functions provided by the application.

A user interface for accessing the digital assistant is provided by the application server 120 using the user interface module 240. For example, a hypertext markup language (HTML) document may be generated by the user interface module 240, transmitted to a client device 160 by the communication module 210, and rendered on a display device of the client device 160 by a web browser executing on the client device 160. The user interface may comprise text fields, drop-down menus, and other input fields. For example, the user may be prompted with a list of recognized inputs for the digital assistant and enabled to select one of the inputs, and thus one of the functions of the digital assistant. After the selection is made, the digital assistant may interact with the application to retrieve information and present the retrieved information to the user.

Queries, results, notes, machine-learning models, training data, or any suitable combination thereof may be stored and accessed by the storage module 250. For example, local storage of the application server 120, such as a hard drive, may be used. As another example, network storage may be accessed by the storage module 250 via the network 190.

Figure 3:
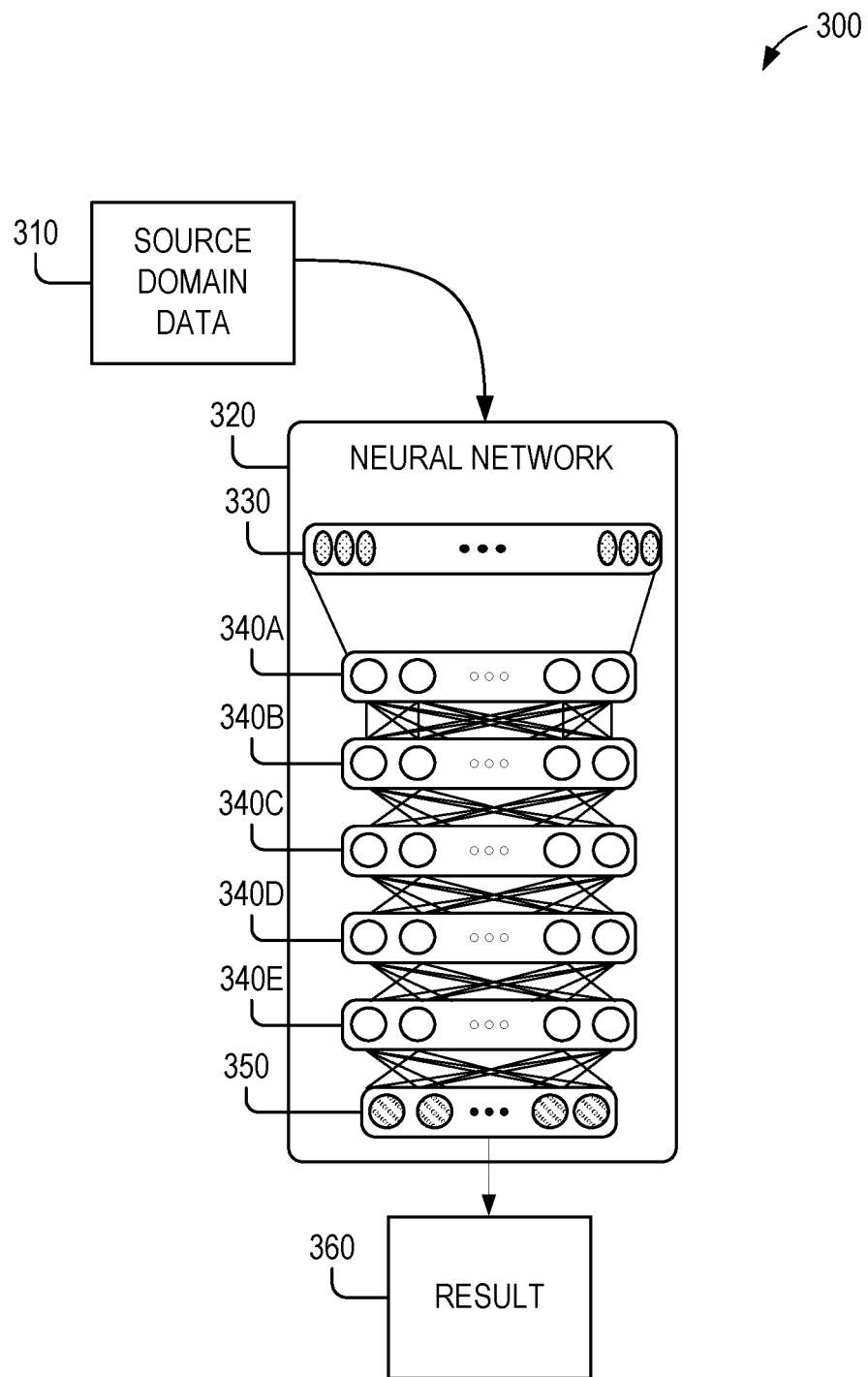
FIG. 3 is a block diagram of a machine learning model, suitable for use in generating digital assistants from source code repositories, according to some example embodiments.

FIG. 3 illustrates the structure 300 of a neural network 320, according to some example embodiments. The neural network 320 takes source domain data 310 as input and processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10,100,500, or 1000. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs-having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

The neural network 320 may be a deep learning neural network, a deep convolutional neural network, a recurrent neural network, a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like.

With the help of natural language processing (NLP) and advanced data pre-processing, a machine learning model (e.g., the neural network 320) can be trained on all historical (existing) business entities (for instance, incidents, email interactions, etc.) from the system to assign them with a certain set of keywords or a dominant topic label based on textual fields such as description, subject, and so forth.

A topic label can be a human-readable phrase or word specific to the industry that it belongs to. It can be determined based on a set of keywords. For instance, if an object contains a long text of multiple words, this model will detect the most "relevant" and "important" keywords and assign them to different ensembles based on multiple factors. Some factors include feature importance and linguistic proximity. Feature importance is an NLP technique used to determine the most important and relevant textual fields provided from an input. Linguistic proximity refers to a distance between vector representations of keywords in two (or more) textual inputs. Additional factors include word commonalities, n-gram commonalities, and the like.

Related data objects may be assigned a human-legible "topic." Based on the existing topics and the contents of a new data object, the new data object is automatically assigned to one of the existing topics.

The transformer architecture processes an entire input at once rather than sequentially. For example, a RNN processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process.

Figure 4:
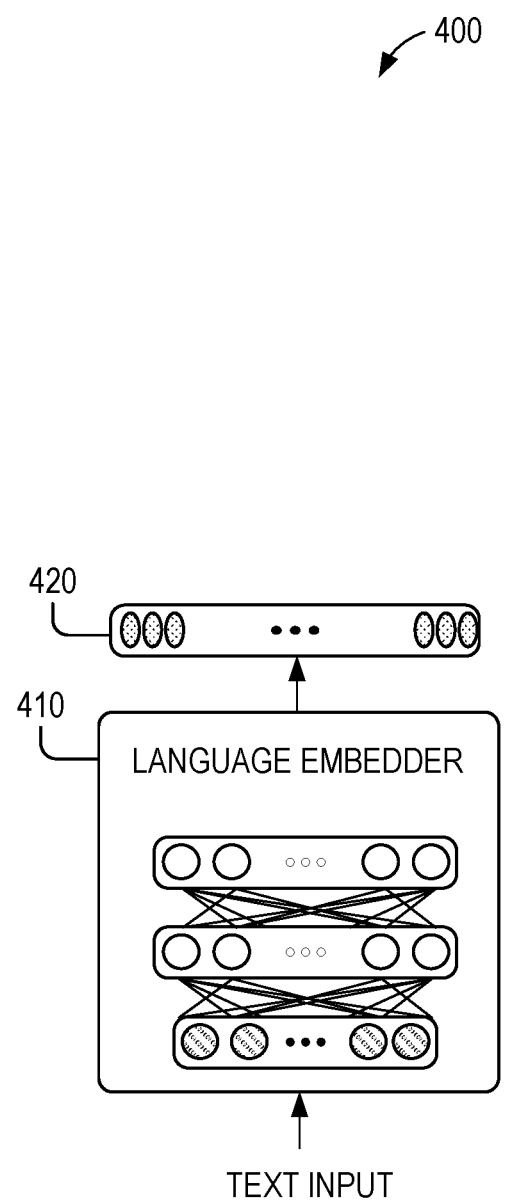
FIG. 4 is a block diagram of a language embedder, suitable for generating vector representation of input text, according to some example embodiments.

FIG. 4 is a block diagram 400 of a trained language embedder 410, according to some example embodiments, suitable for use in generating word vectors. The language embedder 410 generates resulting vector 420. The language embedder 410 is trained so that the distance (or loss) function for two related text fields is reduced or minimized.

The specific architecture of the language embedder 410 may be chosen dependent on the type of input data for an embedding layer that is followed by some encoder architecture that creates a vector from the sequence. Embeddings and encoder parameters are shared between the text fields. In the simplest case, the encoder stage is just an elementwise average of the token embeddings.

In some example embodiments, the word vectors are normalized so that each word vector has a magnitude of one. A vector for text comprising multiple words may be obtained by averaging the vectors of the words in the text. To determine the difference between two vectors, the Euclidean distance formula may be used, taking the square root of the sum of the squares of the differences of corresponding elements of the two vectors.

Figure 5:
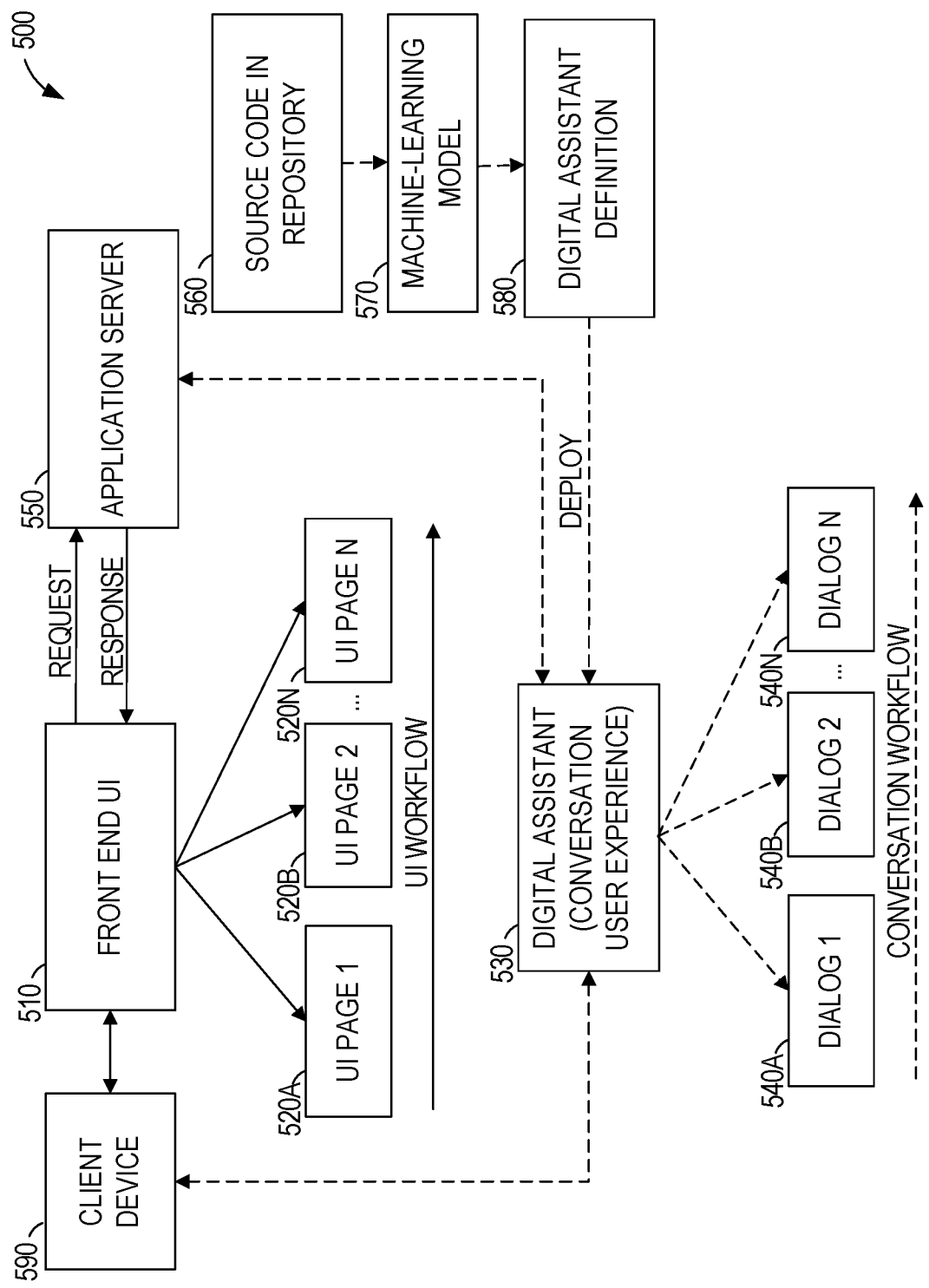
FIG. 5 is a flow diagram showing generating digital assistants from source code repositories, according to some example embodiments.

FIG. 5 is a flow diagram 500 showing generating digital assistants from source code repositories, according to some example embodiments. A user of a client device 590 interacts with a front-end user interface (UI) 510 to interact with an application provided by an application server 550. The front-end UI 510 makes use of a series of UI pages 520A, 520B, ..., 520N that comprise a UI workflow. The front-end UI 510 and the UI workflow may have been created by the developers of the application provided by the application server 550 for use by a number of different users and customers. As a result, the front-end UI 510 may provide a generic user interface that is not customized for the user and may take multiple interactions in order to generate frequently desired results.

The digital assistant 530 provides an alternative interface to the application. A conversation workflow comprises a series of dialogs 540A, 540B, . . . , 540N. The digital assistant 530 interacts with the application server 550 to invoke application functionality and provide the results to the client device 590. Thus, a digital assistant that is customized to provide frequently accessed functionality may reduce the level of effort required by the user to access that functionality. For example, a report may be requested with a single interaction instead of by navigating through multiple ones of the UI pages 520A-520N. As a result, the amount of network traffic used by the client device 590 in submitting the request is reduced, saving network bandwidth and processor cycles.

The digital assistant 530 may be a deployed digital assistant definition 580 that was automatically generated by a machine-learning model 570 based on the source code 560 for the application in a source code repository. As a result, efforts involved in manually developing the digital assistant 530 are reduced.

The source code 560 may include backend API code, frontend UI code, test cases, or any suitable combination thereof. The machine-learning model 570 may analyze the frontend UI code to determine a relationship between user inputs and API calls. Based on the determined relationships, the digital assistant definition 580 may be created to define an alternative interface for providing the user inputs and receiving the results of the API calls.

Figure 6:
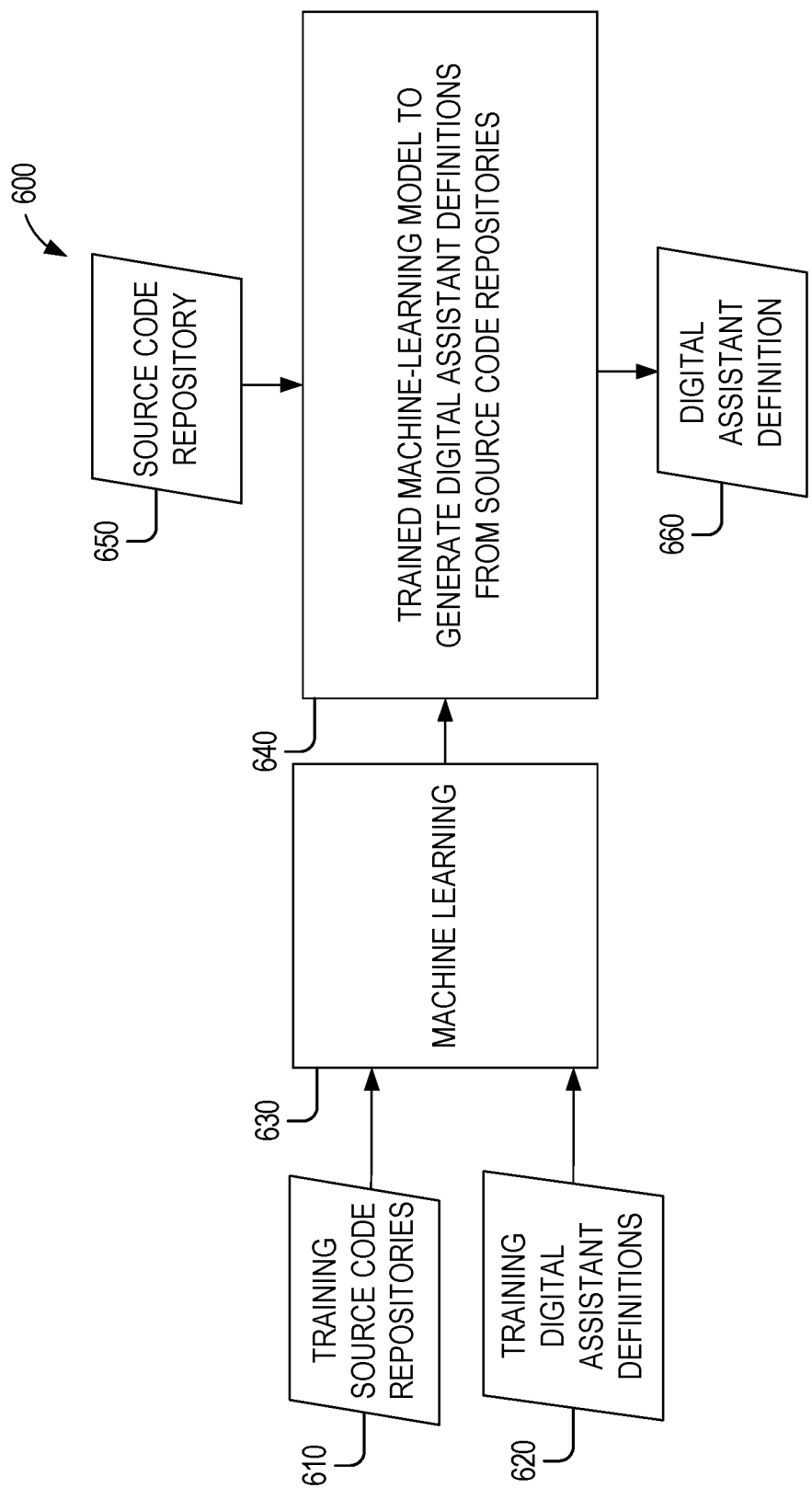
FIG. 6 is a flow diagram showing generating digital assistants from source code repositories, according to some example embodiments.

FIG. 6 is a flow diagram 600 showing generating digital assistants from source code repositories, according to some example embodiments. A machine-learning system 630 receives training source code repositories 610 labeled with training digital assistant definitions 620 as input. Each of the source code repositories 610 may store source code for a different application. The source code repositories 610 may include backend API code, frontend UI code, test cases, or any suitable combination thereof.

In some example embodiments, the machine-learning system 630 also receives additional input data for at least a subset of the training source code repositories 610. For example, a model mapping may be received, based on unified modeling language (UML) diagrams, a data model, or both. As another example, application documentation may be received. The application documentation may be documentation for users of the application (e.g., user manuals, documents for a help portal, or both), documentation for developers of the application (e.g., API documentation, architecture documents, design documents, or any suitable combination thereof), or any suitable combination thereof.

As output, the machine-learning system 630 generates trained machine-learning model 640, trained to generate digital assistant definitions from source code repositories. The trained machine-learning model 640 receives a source code repository 650 for another application and generates a digital assistant definition 660 for the application. Once trained, the machine-learning model 640 may be used to generate digital assistant definitions 660 for many different source code repositories 650.

Figure 7:
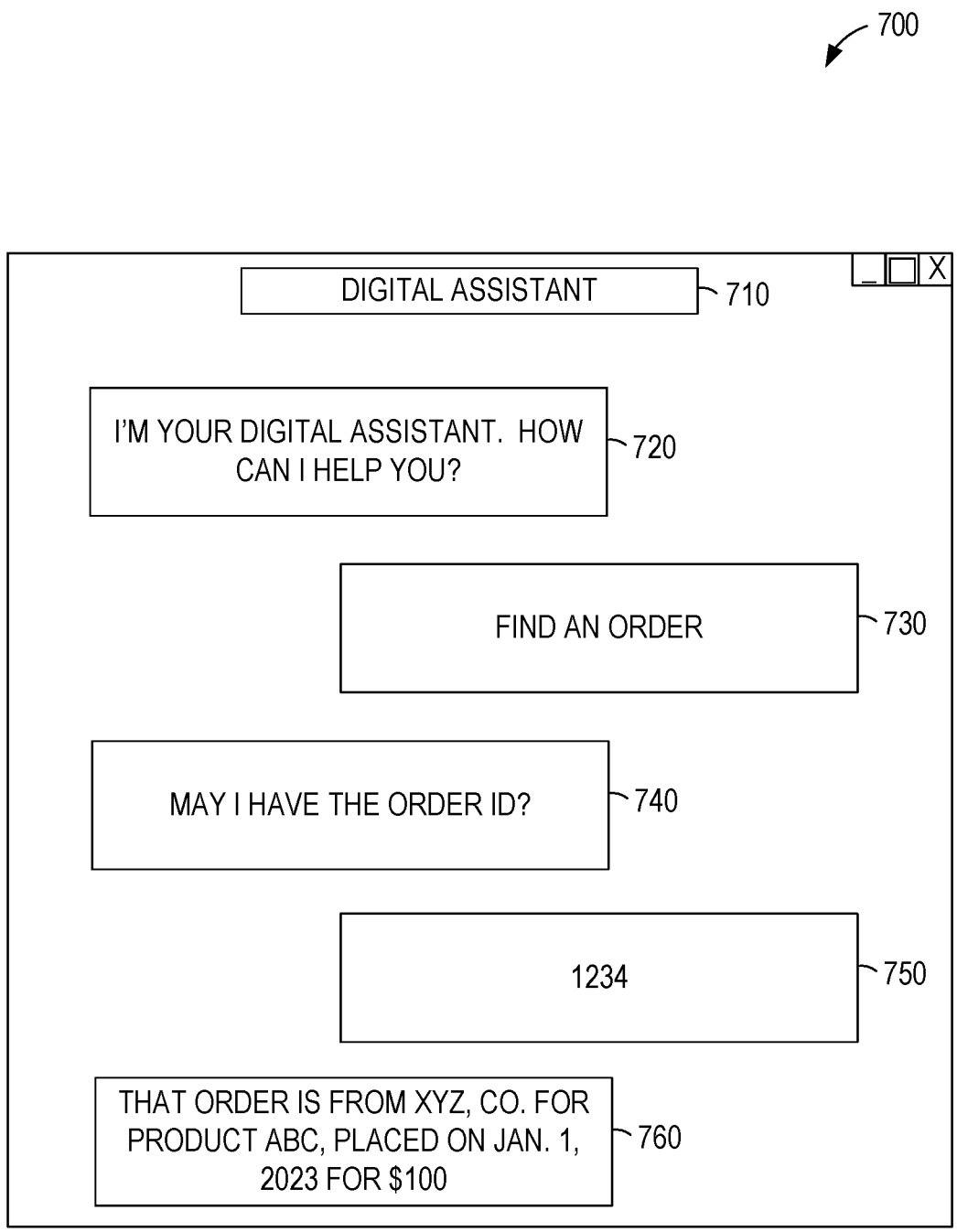
FIG. 7 is an example user interface for a user interacting with a digital assistant.

FIG. 7 is an example user interface 700 for a user interacting with a digital assistant. The example user interface 700 includes a title 710 and messages 720, 730, 740, 750, and 760. The messages 720, 740, and 760 are generated by the digital assistant. The messages 730 and 750 are received from the user. The user interface 700 may be generated by the application server 120 of FIG. 1 and presented on a display device of a client device 160 (e.g., via the web interface 170 or the application interface 180).

The title 710 indicates that the user interface 700 is for interaction with a digital assistant (e.g., the digital assistant 530 of FIG. 5). When the user connects to the digital assistant, the digital assistant generates the message 720, initiating a conversation user experience. The user responds to the prompt with the message 730, asking the digital assistant to find an order. Based on keywords in the message 730 or by providing the text of the message 730 to a trained machine-learning model, the digital assistant interprets the message 730 and responds with the message 740. The message 740 asks the user for an order identifier.

The user responds with an order identifier in the message 750, enabling the digital assistant to look up the order and respond with the message 760, including information about the order. A wide variety of applications may be supported by digital assistants. The digital assistants may retrieve information and present the information to the user, as in the example of FIG. 7. Alternatively or additionally, the digital assistants may receive information from the user and store it in a database, initiate processes, or any suitable combination thereof.

The digital assistant definition 580 used to generate the digital assistant 530 may comprises a skill that relates a user intent to a function of an application programming interface (API). The digital assistant 530 may determine that the message 730 or the message 750 matches the user intent of the skill. Based on detecting a match of the user input to the user intent of the skill, the digital assistant 530 calls the function of the API to access data and provides the data via the user interface.

Figure 8:
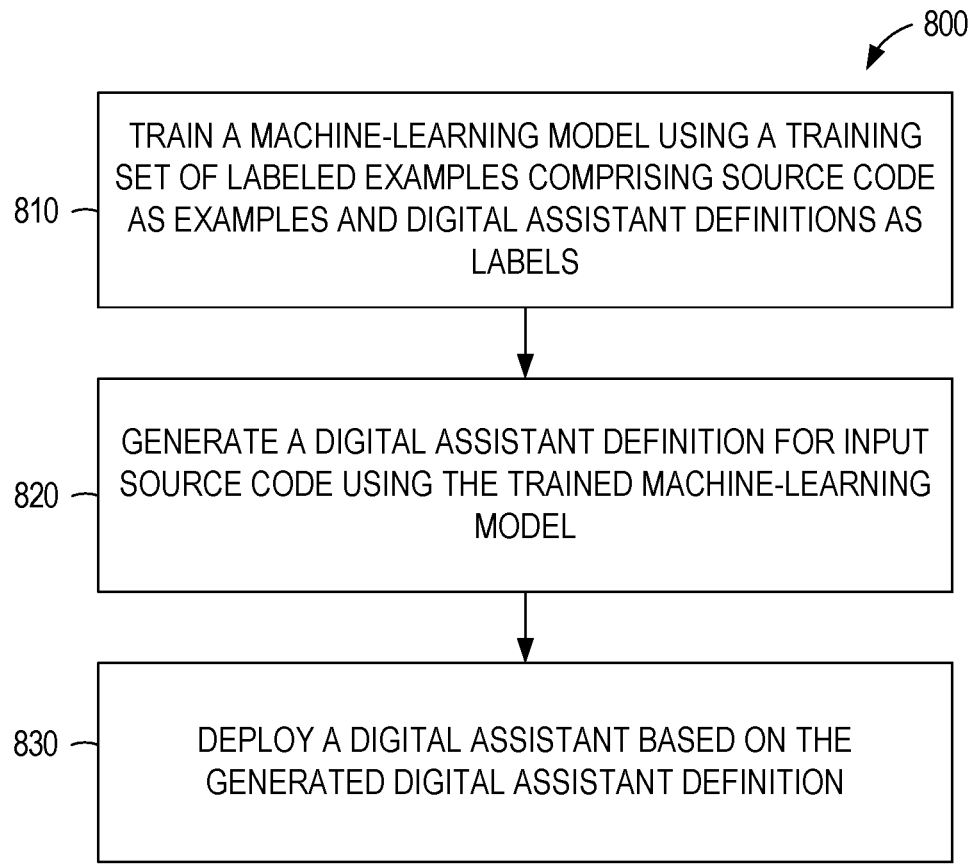
FIG. 8 is a flowchart for a method of generating digital assistants from source code repositories, according to some example embodiments.

FIG. 8 is a flowchart for a method 800 of generating digital assistants from source code repositories, according to some example embodiments. The method 800 includes operations 810, 820, and 830. By way of example and not limitation, the method 800 may be performed by the application server 120 and the machine learning server 140, both of FIG. 1, using the modules, databases, structures, and user interfaces shown in FIGS. 2-7.

In operation 810, the machine learning server 140 trains a machine-learning model using a training set of labeled examples comprising source code as examples and digital assistant definitions as labels. For example, the source code repositories for multiple applications and the corresponding digital assistant definitions may be used for training.

The labeled examples to use may be selected based on whether the digital assistant definitions are valid. For example, a digital assistant generation tool may be provided each digital assistant definition as input. If the tool generates an error message or otherwise fails to successfully generate a digital assistant for the digital assistant definition, the source code and invalid digital assistant definition may be skipped and not included in the training set of labeled examples.

Different or additional criteria may be used to select the labeled examples. For example, selecting the source code for the labeled examples of the training set from a source code repository may be based on a number of lines of the source code. In some example embodiments, source code comprising fewer than a minimum threshold number of lines (e.g., 500 or 1000 lines) or more than a maximum threshold number of lines (e.g., 1,000,000 lines) is not used for training.

The trained machine-learning model is used in operation 820 to generate a digital assistant definition for input source code. For example, a source code repository for an application lacking a digital assistant may be supplied as input to the trained machine-learning model. Based on its training, the machine-learning model generates a digital assistant definition for the provided input.

In operation 830, a digital assistant is deployed to the application server 120 based on the generated digital assistant definition. For example, the digital assistant definition may be used by a digital assistant application to control interaction with a user via the user interface 700 of FIG. 7.

By virtue of the method 800, support is provided to a user that allows the user to efficiently interact with an application using a natural language interface without manual creation of a digital assistant by a domain expert. Accordingly, effort in providing support is reduced. Also, operations 810 and 820 may repeated periodically (e.g., weekly or monthly), automatically updating the digital assistant based on further training of the machine-learning model and providing updated assistance to the user. Likewise, operations 810 and 820 may be repeated automatically with each update of the application. By contrast, the level of effort involved in manual creation of digital assistants is such that updating the digital assistant is performed rarely (e.g., yearly) and there may be a substantial delay between the modification of an application and the updating of the corresponding digital assistant. During the delay period, user's seeking to take advantage of new application features will be unable to do so using the digital assistant. Thus, the proposed system saves labor and time. Computer resources are saved by virtue of processing requests more quickly, as CPU cycles, network bandwidth consumption, power consumption, and the like are all commensurately reduced.

Figure 9:
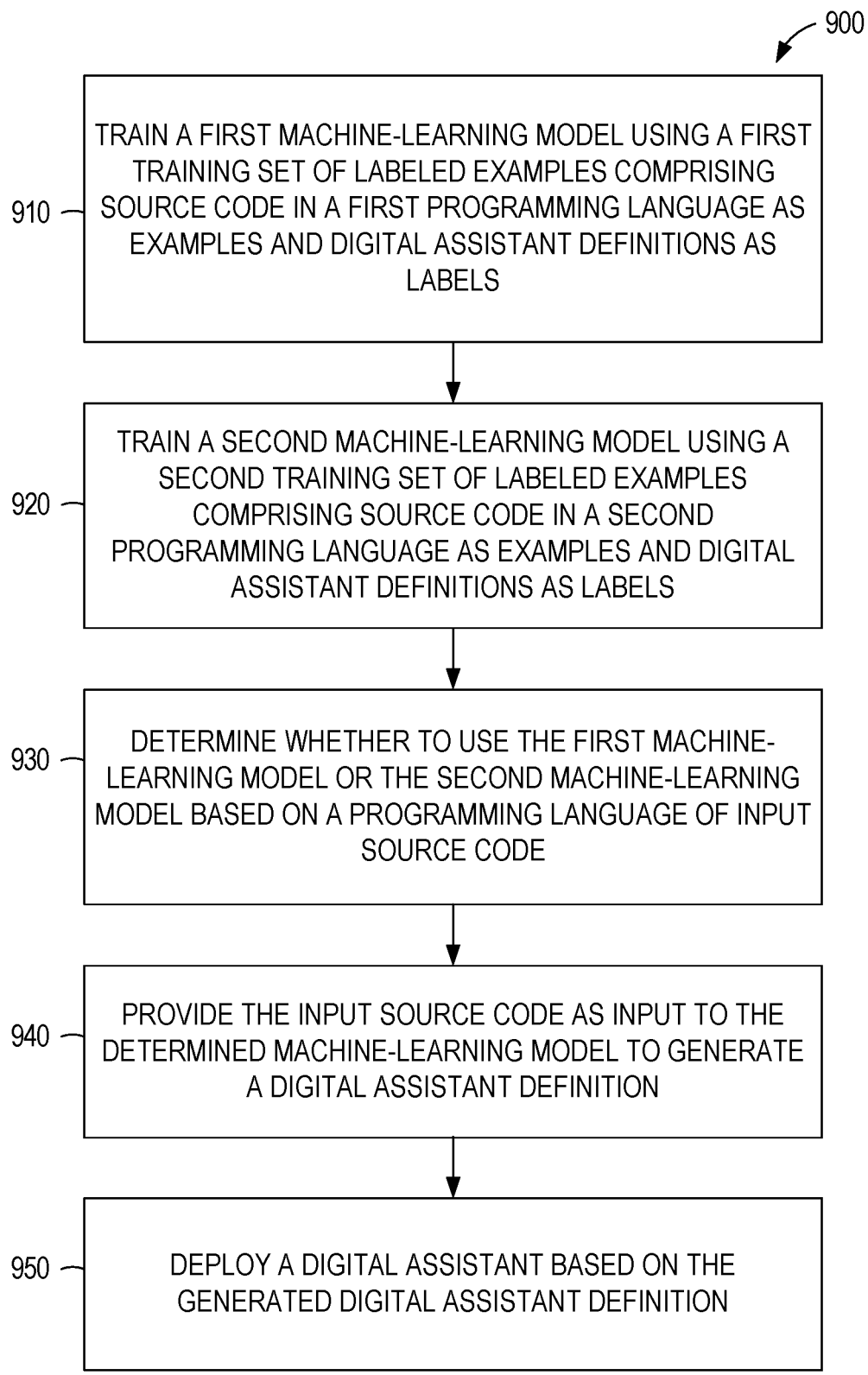
FIG. 9 is a flowchart for a method of generating digital assistants from source code repositories, according to some example embodiments.

FIG. 9 is a flowchart for a method 900 of generating digital assistants from source code repositories, according to some example embodiments. The method 900 includes operations 910, 920, 930, 940, and 950. By way of example and not limitation, the method 900 may be performed by the application server 120 and the machine learning server 140, both of FIG. 1, using the modules, databases, structures, and user interfaces shown in FIGS. 2-7.

In operation 910, the machine learning server 140 trains a first machine-learning model using a first training set of labeled examples comprising source code in a first programming language as examples and digital assistant definitions as labels. For example, a corpus of source code repositories for applications may be accessed and sorted based on the programming language used for each application. The source code for a first set of applications in a first programming language (e.g., C, Java, JavaScript, Ruby, Python, and the like) may be used to train the first machine-learning model.

A second machine-learning model is trained by the machine learning server 140 in operation 140. The second machine-learning model is trained using a second training set of labeled examples comprising source code in a second programming language as examples and digital assistant definitions as labels. For example, if the first machine-learning model was trained using source code for applications written in C, the second machine-learning model may be trained using source code for applications written in JavaScript. The training of separate machine-learning models for different programming languages may be repeated for any number of programming languages.

In operation 930, the application server 120 determines whether to use the first machine-learning model or the second machine-learning model based on a programming language of input source code. For example, a user may direct the application server 120 to generate a digital assistant definition for an identified source code repository (e.g., by providing a path in a file system to the source code repository). The application server 120 may automatically determine a programming language of the source code of the source code repository (e.g., based on file names, based on output from a machine-learning model trained to identify the programming language of input files, based on output from interpreters or compilers for candidate programming languages, or any suitable combination thereof). Based on the determined programming language, the corresponding machine-learning model is determined to be used to generate the digital assistant definition.

The determined trained machine-learning model is used in operation 940 to generate a digital assistant definition for input source code. For example, a source code repository for an application lacking a digital assistant may be supplied as input to the trained machine-learning model. Based on its training, the machine-learning model generates a digital assistant definition for the provided input.

In operation 950, a digital assistant is deployed to the application server 120 based on the generated digital assistant definition. For example, the digital assistant definition may be used by a digital assistant application to control interaction with a user via the user interface 700 of FIG. 7.

By use of the method 900, multiple machine-learning models are trained for use in generating digital assistants for source code written in different programming language. The division of intelligence among multiple machine-learning models may generate better results than training a single machine-learning model for all programming languages. By automatically detecting the language of input source code and directing the source code to the corresponding machine-learning model, user effort in selecting the correct machine-learning model is reduced.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors configured by the instructions to perform operations comprising: training a machine-learning model using a training set of labeled examples comprising source code as examples and digital assistant definitions as labels; generating a digital assistant definition for input source code using the trained machine-learning model; and deploying a digital assistant based on the generated digital assistant definition.

In Example 2, the subject matter of Example 1, wherein: the machine-learning model is a first machine-learning model; the training set of labeled examples comprising source code as examples is a first training set of first labeled examples comprising source code in a first programming language as first examples; and the operations further comprise: training a second machine-learning model using a second training set of second labeled examples comprising source code in a second programming language as second examples and digital assistant definitions as labels; and determining whether to use the first machine-learning model or the second machine-learning model based on a programming language of the input source code.

In Example 3, the subject matter of Examples 1-2, wherein the training of the machine-learning model comprises: selecting the source code for the labeled examples of the training set from a source code repository based on a programming language of the source code.

In Example 4, the subject matter of Examples 1-3, wherein the training of the machine-learning model comprises: selecting the digital assistant definitions for the labeled examples of the training set from a source code repository based on a validity of the digital assistant definitions.

In Example 5, the subject matter of Examples 1-4, wherein the training of the machine-learning model comprises: selecting the source code for the labeled examples of the training set from a source code repository based on a number of lines of the source code.

In Example 6, the subject matter of Examples 1-5, wherein the machine-learning model uses a transformer model architecture.

In Example 7, the subject matter of Examples 1-6, wherein the generated digital assistant definition comprises a skill that relates a user intent to a function of an application programming interface (API).

In Example 8, the subject matter of Example 7, wherein the operations further comprise: receiving, via a user interface, a user input; based on detecting a match of the user input to the user intent of the skill, calling the function of the API to access data; and providing the data via the user interface.

Example 9 is a non-transitory machine-readable medium that stores instructions that, when executed by one or more processors, cause the one or more processors to perform operations comprising: training a machine-learning model using a training set of labeled examples comprising source code as examples and digital assistant definitions as labels; generating a digital assistant definition for input source code using the trained machine-learning model; and deploying a digital assistant based on the generated digital assistant definition.

In Example 10, the subject matter of Example 9, wherein: the machine-learning model is a first machine-learning model; the training set of labeled examples comprising source code as examples is a first training set of first labeled examples comprising source code in a first programming language as first examples; and the operations further comprise: training a second machine-learning model using a second training set of second labeled examples comprising source code in a second programming language as second examples and digital assistant definitions as labels; and determining whether to use the first machine-learning model or the second machine-learning model based on a programming language of the input source code.

In Example 11, the subject matter of Examples 9-10, wherein the training of the machine-learning model comprises: selecting the source code for the labeled examples of the training set from a source code repository based on a programming language of the source code.

In Example 12, the subject matter of Examples 9-11, wherein the training of the machine-learning model comprises: selecting the digital assistant definitions for the labeled examples of the training set from a source code repository based on a validity of the digital assistant definitions.

In Example 13, the subject matter of Examples 9-12, wherein the training of the machine-learning model comprises: selecting the source code for the labeled examples of the training set from a source code repository based on a number of lines of the source code.

In Example 14, the subject matter of Examples 9-13, wherein the machine-learning model uses a transformer model architecture.

In Example 15, the subject matter of Examples 9-14, wherein the generated digital assistant definition comprises a skill that relates a user intent to a function of an application programming interface (API).

In Example 16, the subject matter of Example 15, wherein the operations further comprise: receiving, via a user interface, a user input; based on detecting a match of the user input to the user intent of the skill, calling the function of the API to access data; and providing the data via the user interface.

Example 17 is a method comprising: training, by one or more processors, a machine-learning model using a training set of labeled examples comprising source code as examples and digital assistant definitions as labels; generating a digital assistant definition for input source code using the trained machine-learning model; and deploying a digital assistant based on the generated digital assistant definition.

In Example 18, the subject matter of Example 17, wherein: the machine-learning model is a first machine-learning model; the training set of labeled examples comprising source code as examples is a first training set of first labeled examples comprising source code in a first programming language as first examples; and the method further comprises: training a second machine-learning model using a second training set of second labeled examples comprising source code in a second programming language as second examples and digital assistant definitions as labels; and determining whether to use the first machine-learning model or the second machine-learning model based on a programming language of the input source code.

In Example 19, the subject matter of Examples 17-18, wherein the training of the machine-learning model comprises: selecting the source code for the labeled examples of the training set from a source code repository based on a programming language of the source code.

In Example 20, the subject matter of Examples 17-19, wherein the training of the machine-learning model comprises: selecting the digital assistant definitions for the labeled examples of the training set from a source code repository based on a validity of the digital assistant definitions.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
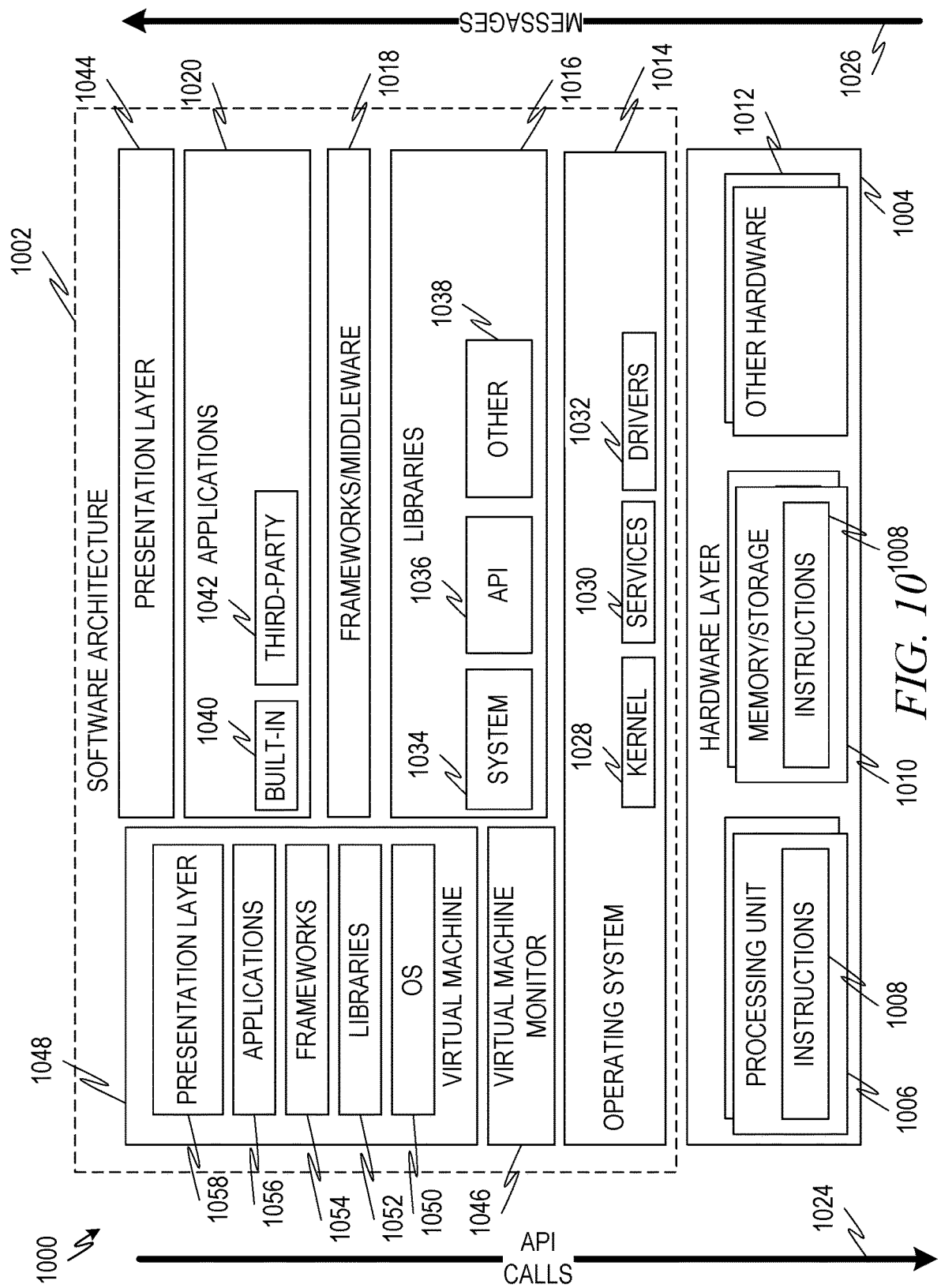
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
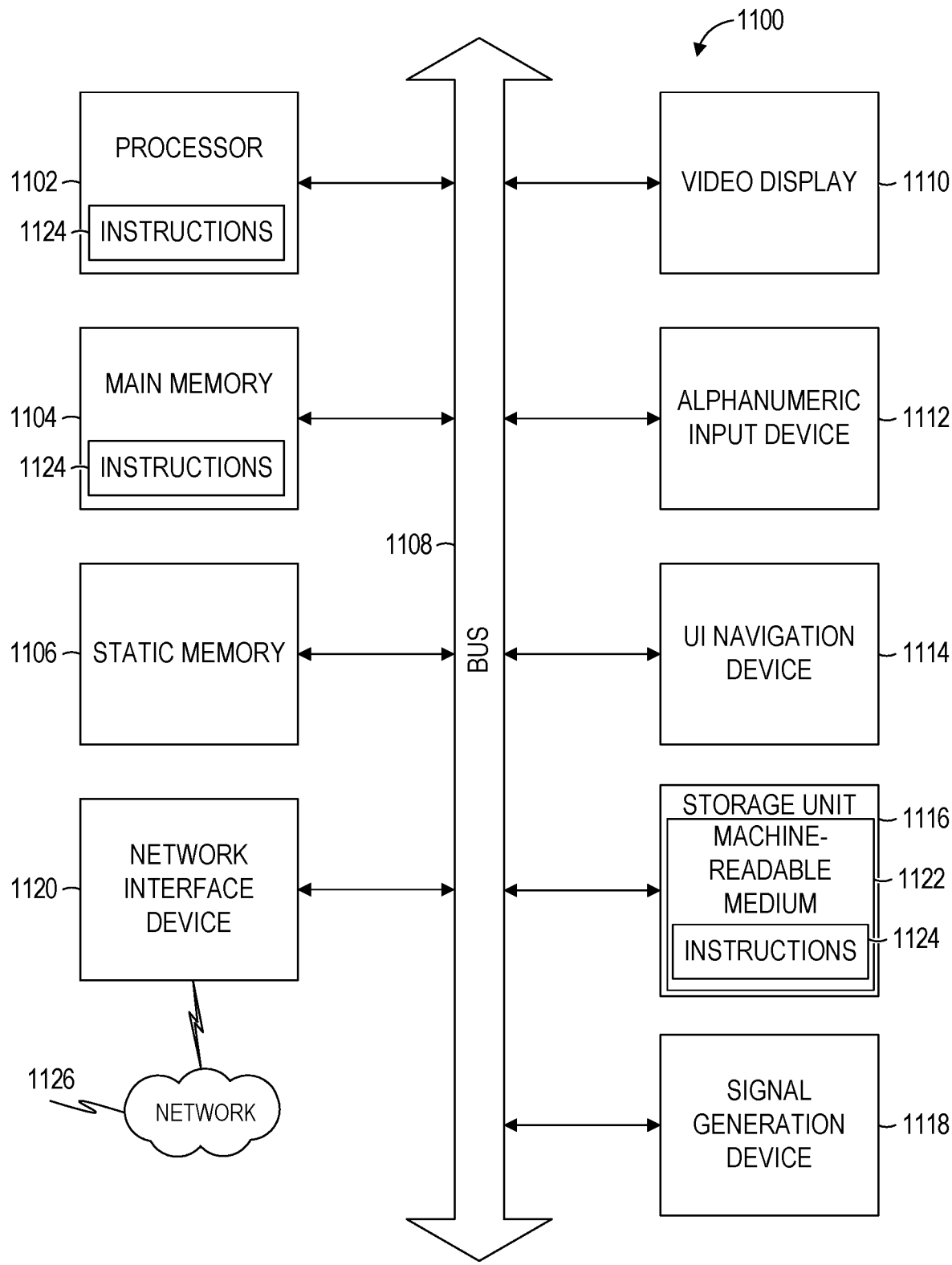
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
a memory that stores instructions; and
one or more processors configured by the instructions to perform operations comprising:
training a machine-learning model using a training set of labeled examples comprising source code as examples and digital assistant definitions as labels;
generating a digital assistant definition for input source code using the trained machine-learning model; and
deploying a digital assistant based on the generated digital assistant definition.

2. The system of claim 1, wherein:
the machine-learning model is a first machine-learning model;
the training set of labeled examples comprising source code as examples is a first training set of first labeled examples comprising source code in a first programming language as first examples; and
the operations further comprise:
training a second machine-learning model using a second training set of second labeled examples comprising source code in a second programming language as second examples and digital assistant definitions as labels; and
determining whether to use the first machine-learning model or the second machine-learning model based on a programming language of the input source code.

3. The system of claim 1, wherein the training of the machine-learning model comprises:
selecting the source code for the labeled examples of the training set from a source code repository based on a programming language of the source code.

4. The system of claim 1, wherein the training of the machine-learning model comprises:
selecting the digital assistant definitions for the labeled examples of the training set from a source code repository based on a validity of the digital assistant definitions.

5. The system of claim 1, wherein the training of the machine-learning model comprises:
selecting the source code for the labeled examples of the training set from a source code repository based on a number of lines of the source code.

6. The system of claim 1, wherein the machine-learning model uses a transformer model architecture.

7. The system of claim 1, wherein the generated digital assistant definition comprises a skill that relates a user intent to a function of an application programming interface (API).

8. The system of claim 7, wherein the operations further comprise:
receiving, via a user interface, a user input;
based on detecting a match of the user input to the user intent of the skill, calling the function of the API to access data; and
providing the data via the user interface.

9. A non-transitory machine-readable medium that stores instructions that, when executed by one or more processors, cause the one or more processors to perform operations comprising:
training a machine-learning model using a training set of labeled examples comprising source code as examples and digital assistant definitions as labels;
generating a digital assistant definition for input source code using the trained machine-learning model; and
deploying a digital assistant based on the generated digital assistant definition.

10. The non-transitory machine-readable medium of claim 9, wherein:
the machine-learning model is a first machine-learning model;
the training set of labeled examples comprising source code as examples is a first training set of first labeled examples comprising source code in a first programming language as first examples; and
the operations further comprise:
training a second machine-learning model using a second training set of second labeled examples comprising source code in a second programming language as second examples and digital assistant definitions as labels; and
determining whether to use the first machine-learning model or the second machine-learning model based on a programming language of the input source code.

11. The non-transitory machine-readable medium of claim 9, wherein the training of the machine-learning model comprises:
selecting the source code for the labeled examples of the training set from a source code repository based on a programming language of the source code.

12. The non-transitory machine-readable medium of claim 9, wherein the training of the machine-learning model comprises:

selecting the digital assistant definitions for the labeled examples of the training set from a source code repository based on a validity of the digital assistant definitions.

13. The non-transitory machine-readable medium of claim 9, wherein the training of the machine-learning model comprises:
    selecting the source code for the labeled examples of the training set from a source code repository based on a number of lines of the source code.

14. The non-transitory machine-readable medium of claim 9, wherein the machine-learning model uses a transformer model architecture.

15. The non-transitory machine-readable medium of claim 9, wherein the generated digital assistant definition comprises a skill that relates a user intent to a function of an application programming interface (API).

16. The non-transitory machine-readable medium of claim 15, wherein the operations further comprise:
    receiving, via a user interface, a user input;
    based on detecting a match of the user input to the user intent of the skill, calling the function of the API to access data; and
    providing the data via the user interface.

17. A method comprising:
    training, by one or more processors, a machine-learning model using a training set of labeled examples comprising source code as examples and digital assistant definitions as labels;
    generating a digital assistant definition for input source code using the trained machine-learning model; and
    deploying a digital assistant based on the generated digital assistant definition.

18. The method of claim 17, wherein:
    the machine-learning model is a first machine-learning model;
    the training set of labeled examples comprising source code as examples is a first training set of first labeled examples comprising source code in a first programming language as first examples; and
    the method further comprises:
        training a second machine-learning model using a second training set of second labeled examples comprising source code in a second programming language as second examples and digital assistant definitions as labels; and
        determining whether to use the first machine-learning model or the second machine-learning model based on a programming language of the input source code.

19. The method of claim 17, wherein the training of the machine-learning model comprises:
    selecting the source code for the labeled examples of the training set from a source code repository based on a programming language of the source code.

20. The method of claim 17, wherein the training of the machine-learning model comprises:
    selecting the digital assistant definitions for the labeled examples of the training set from a source code repository based on a validity of the digital assistant definitions.

\* \* \* \* \*